Feb. 17, 1925.

V. J. CYR 1,526,837

POTATO CULTIVATOR

Filed Oct. 8, 1923

Inventor

Vital Joachim Cyr.

By

Attorney

Patented Feb. 17, 1925.

1,526,837

UNITED STATES PATENT OFFICE.

VITAL J. CYR, OF ST. DAVID, MAINE.

POTATO CULTIVATOR.

Application filed October 8, 1923. Serial No. 667,099.

*To all whom it may concern:*

Be it known that I, VITAL J. CYR, a citizen of the United States, residing at St. David, in the county of Aroostook and State of Maine, have invented certain new and useful Improvements in Potato Cultivators, of which the following is a specification.

This invention relates generally to agricultural implements, having more particular reference to a potato cultivator, the invention having for an object the provision of a simple and efficient cultivator for potatoes.

For further comprehension of the invention and of the objects and advantages thereof, reference will be had to the following description and accompanying drawings, and to the appended claims in which the various novel features of the invention are more particularly set forth.

Figure 1:
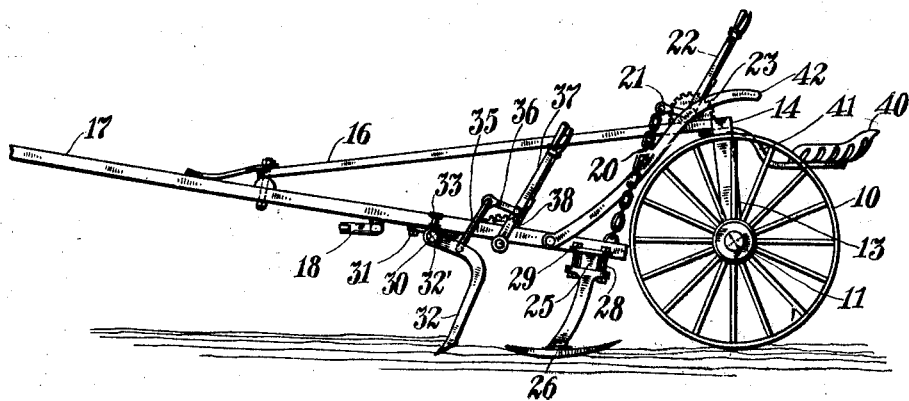

Fig. 1 of the drawings is a side view of my improved cultivator for potatoes.

Figure 2:
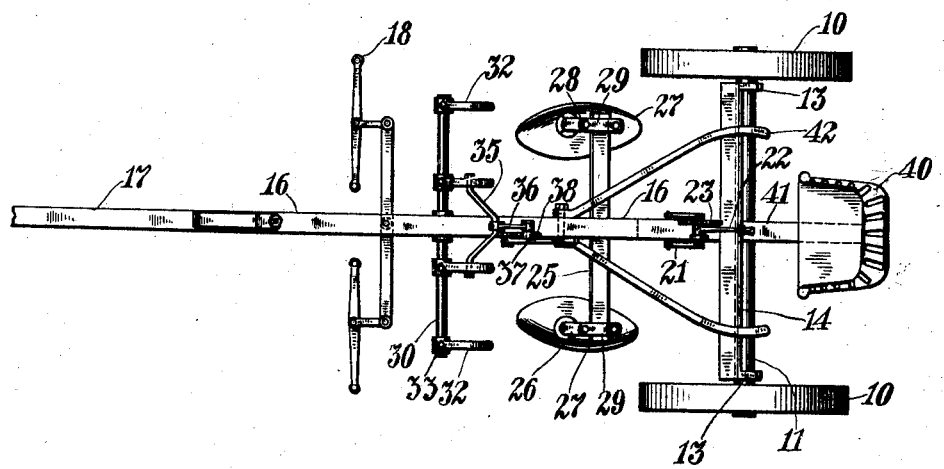

Fig. 2 is a plan view thereof.

As here embodied my improved cultivator comprises a pair of wheels 10 mounted on the ends of an axle 11. Freely engaging this axle just inwardly of the wheels 10, are the legs 13 of a U-frame 14 whose main body is in the form of a transverse bar. To this frame is fixed, midway between the ends thereof, the rear end of a longitudinal bar or tongue 16, which has attached to its forward end a second tongue or bar 17, the point of connection of the two bars being substantially midway between the ends of the last named bar. This last tongue or bar 17 has suitable draft gear such as 18 connected thereto for hitching a pair of horses to the cultivator.

Connected to the rear end of this tongue 17 is a chain 20 which extends upwardly and is connected at its other end to an arm 21 formed integral with an adjusting lever fulcrumed on the other bar 16, suitable locking means, indicated generally at 23, being provided to hold the lever 22 in adjusted positions. Fixed to the rear end of the tongue 17 is a transverse bar or piece 25 to which are attached the upper ends of legs or stems such as 26 to whose lower ends are fixed plates 27 for smoothing the ground.

The stems 26 are here shown as clamped to the crosspiece 25 by means of bolts 28 passed through the laterally extended top ends of said stems and clamping plates 29 which bear on the top of the crosspiece.

A second crosspiece 30, of circular cross section, is carried by the tongue or bar 17 a short distance in front of the crosspiece 25, this latter crosspiece 30 being mounted for rotation in a bracket 31 fixed to the under side of the said tongue but being held against longitudinal movement. Fixed to this crosspiece are several cultivator teeth 32 which curve rearwardly and downwardly from eyes 32' formed integrally thereon which engage over the crosspiece 30, set screws 33 holding the teeth in position. To adjust these teeth a yoke 35 is attached to the two inner ones thereof and has attached thereto one end of a rearwardly extending link 36 whose other end is connected to a hand lever 37 provided with the usual locking means indicated generally at 38. By moving this lever to different positions the points of the teeth 32 may be raised or lowered as may be desired.

A seat 40 for the man operating the cultivator is provided, this seat being mounted on the end of a bar 41 fixed to the U-frame 14. A pair of handles 42 are also provided and are fastened to the tongue 17 and extend rearwardly and upwardly to a position to be conveniently grasped by the operator. The tongue 17, it will be noted, swings freely from the frame of the cultivator. The operator then, by grasping the handles 42 and placing his feet on the rear crosspiece 25, can readily manipulate the tongue to guide the cultivator teeth 32 and the members 27.

Having thus described my invention what I claim as new and desire to protect by Letters Patent of the United States is as follows:

A cultivator comprising a pair of wheels, a frame mounted thereon and including a forwardly projecting bar, a tongue suspended from the forward end of said bar, and cultivator elements carried by said tongue, said cultivator elements comprising cultivator teeth and ground-smoothing plates, means rigidly attaching said ground smoothing plates to said tongue, means on said tongue for raising and lowering the cultivator teeth, and a suspension device connected to the rear end of said tongue and arranged for up and down adjustment of said rear end.

In testimony whereof I have affixed my signature.

VITAL J. CYR.